(12) United States Patent
Dong et al.

(10) Patent No.: US 9,787,176 B2
(45) Date of Patent: Oct. 10, 2017

(54) CHARGE PUMP

(71) Applicant: TAIWAN SEMICONDUCTOR MANUFACTURING COMPANY, LTD., Hsinchu (TW)

(72) Inventors: Qing Dong, Ann Arbor, MI (US);
Tien-Chun Yang, San Jose, CA (US);
Yue-Der Chih, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 15/040,283

(22) Filed: Feb. 10, 2016

(65) Prior Publication Data

US 2016/0268893 A1    Sep. 15, 2016

Related U.S. Application Data

(60) Provisional application No. 62/133,233, filed on Mar. 13, 2015.

(51) Int. Cl.
G05F 1/10    (2006.01)
H02M 3/07   (2006.01)

(52) U.S. Cl.
CPC ..................... H02M 3/07 (2013.01)

(58) Field of Classification Search
CPC ....................................................... H02M 3/07
USPC ...................... 327/536; 363/59, 60
See application file for complete search history.

(56) References Cited

U.S. PATENT DOCUMENTS

| | | | | |
|---|---|---|---|---|
| 7,382,176 B2 * | 6/2008 | Ayres | .................... | H02M 3/073 327/536 |
| 7,795,951 B2 * | 9/2010 | Choy | .................... | H02M 3/073 327/536 |
| 8,049,553 B2 * | 11/2011 | Kim | ....................... | G11C 5/145 327/536 |
| 8,339,185 B2 * | 12/2012 | Cazzaniga | ............. | G11C 5/145 327/536 |
| 8,519,779 B2 * | 8/2013 | Ryu | ......................... | G11C 5/14 327/536 |
| 8,547,168 B2 * | 10/2013 | Kok | ........................ | H02M 3/07 327/536 |
| 8,598,854 B2 | 12/2013 | Soenen et al. | | |
| 8,629,694 B1 | 1/2014 | Wang et al. | | |
| 8,629,706 B2 | 1/2014 | Chen et al. | | |
| 8,816,670 B2 | 8/2014 | Lee et al. | | |
| 2012/0126763 A1 | 5/2012 | Yang | | |
| 2012/0176186 A1 | 7/2012 | Chen et al. | | |

(Continued)

*Primary Examiner* — Kenneth B Wells
(74) *Attorney, Agent, or Firm* — Hauptman Ham, LLP

(57) ABSTRACT

In a charge pump circuit, a first circuit is configured to provide a first node with a first first-voltage level or a first second-voltage level. A second circuit is configured to provide a second node with a second first-voltage level or a second second-voltage level. The first node is coupled with a first end of the first capacitive element. The second node is coupled with a first end of the second capacitive device. A first end of the first voltage transfer circuit is configured to receive an input voltage. A second end of the first voltage transfer circuit is coupled with a second end of the first capacitive device and a first end of the second voltage transfer circuit. A second end of the second voltage transfer circuit is coupled with a second end of the second capacitive element.

20 Claims, 7 Drawing Sheets

(56) References Cited

U.S. PATENT DOCUMENTS

| | | |
|---|---|---|
| 2013/0241510 A1 | 9/2013 | Shi et al. |
| 2013/0307516 A1 | 11/2013 | Horng et al. |
| 2013/0320944 A1 | 12/2013 | Siao |
| 2014/0002041 A1 | 1/2014 | Soenen et al. |
| 2014/0266114 A1 | 9/2014 | Chern et al. |

* cited by examiner

CHARGE PUMP

BACKGROUND

Commonly, a charge pump uses switching capacitors and a lower voltage at an input node to generate a higher voltage at the output node of the charge pump. However, in many situations, a relatively large current results in the charge pump. The large current, together with parasitic capacitance at the output node, which is also commonly large, results in a large input power or large power consumption. In such a situation, if power efficiency is represented by a ratio of the output power over the input, the charge pump is said to have lower power efficiency.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1:
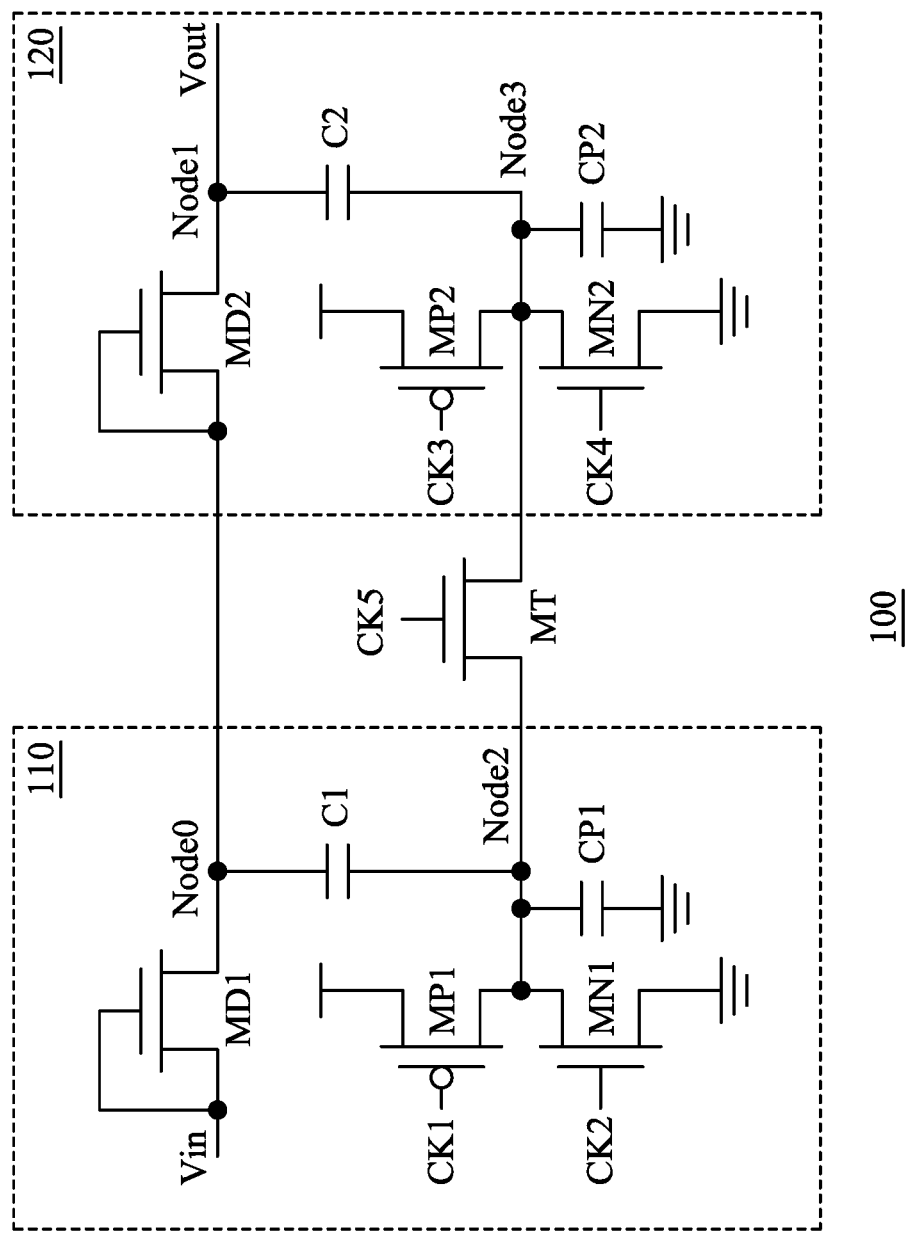
FIG. 1 is a diagram of a charge pump, in accordance with some embodiments.

The following disclosure provides many different embodiments, or examples, for implementing different features of the provided subject matter. Specific examples of components and arrangements are described below to simplify the present disclosure. These are merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Embodiments and/or examples illustrated in the drawings are disclosed below using specific language. Any alterations and modifications in the disclosed embodiments, and any further applications of the principles disclosed in this document are contemplated as would normally occur to one of ordinary skill in the pertinent art.

Some embodiments have one or a combination of the following features and/or advantages. Compared with another approach, power efficiency of a charge pump in various embodiments of the present disclosure improves about 35% to 50%. Further, output current of the charge pump in the various embodiments is also higher.

Charge Pump

FIG. 1 is a diagram of a charge pump circuit or charge pump 100, in accordance with some embodiments. Charge pump 100 includes a circuit 110 and a circuit 120 functioning as a first phase and a second phase for charge pump 100, respectively. Charge pump 100 receives a voltage Vin and provides a voltage Vout at Node1. Voltage Vout has a value higher than that of voltage Vin. For example, in some embodiments, if voltage Vin has a value VDD (not labeled) of a supply voltage, voltage Vout has voltage value of 3 VDD. Expressed in another way, input voltage Vin of VDD is pumped by 2 VDD to result in voltage Vout of 3 VDD.

With reference to circuit 110, NMOS transistor MD1 is configured as a diode, receives input voltage Vin, and provides voltage Vin−Vdiode at Node0, wherein Vdiode is a voltage dropped across diode MD1. In some embodiments, voltage Vdiode is insignificant compared to voltage Vin. As a result, when voltage Vin is VDD, Node0 is considered to also have voltage VDD. N-type transistor MD1 configured as a diode is for illustration. Other transistors, such as a P-type transistor, or other circuits functioning to transfer voltage Vin to Node0, are within the contemplated scope of the present disclosure.

PMOS transistor MP1 and NMOS transistor MN1 have an inverter-like configuration, and provide a voltage on Node2. An inverter-like configuration includes a P-type transistor coupled in series with an N-type transistor. For example, a drain of PMOS transistor MP1 is coupled with a drain of NMOS transistor MN1. Further, a source of PMOS transistor MP1 receives supply voltage VDD, and a source of NMOS MN1 transistor receives supply reference voltage VSS. A gate of PMOS transistor MP1 and a gate of NMOS transistor MN1 receive two different clock signals CK1 and CK2. Signal CK1 at a gate of transistor PMOS MP1 turns on or off transistor MP1. Signal CK2 at a gate of NMOS transistor MN1 turns on or off transistor MN1. In some embodiments, when signal CK1 is logically low, signal CK2 is logically high, and vice versa. As a result, when transistor MP1 is turned on, Node2 is pulled to voltage VDD at the source of transistor MP1. In contrast, when transistor MN1 is turned on, Node2 is pulled to voltage VSS at the source of transistor MN1. The inverter-like configuration is used for illustration. Other circuits causing Node2 to have a high logical value, such as that of VDD, or a low logical value, such as that of voltage VSS, are within the contemplated scope of the present disclosure.

Capacitor C1 provides a capacitive coupling between Node2 and Node0. For example, Node0 is at a value of supply voltage VDD and Node2 is at 0 V, and Node2 increases from 0V to voltage VDD. By operation of capacitor C1, Node0 is raised to 2 VDD. Different ways to form capacitor C1 is within the contemplated scope of the present disclosure. For example, capacitor C1 may be a transistor capacitor, a MOS capacitor, a MIM capacitor, etc.

In some embodiments, capacitor CP1 represents parasitic capacitance of Node2. In some other embodiments, capacitor CP1 represents both parasitic capacitance of Node2 and capacitance of a capacitor coupled to Node2.

Circuit 120 includes circuit elements similar to those of circuit 110. For example, transistor MD2 corresponds to transistor MD1, and is configured as a diode. PMOS transistor MP2 and NMOS transistor MN2 correspond to PMOS transistor MP1 and NMOS transistor MN1, respectively, and have an inverter-like configuration. Capacitors C2 and CP2 correspond to capacitors C1 and CP1, respectively.

NMOS transistor MT functions to transfer the charge between Node2 and Node3. In some embodiments, when transistor MT is turned on, Node2 and Node3 have a same voltage value. For example, when Node2 is at VDD, Node3 is at 0 V, signal CK5 is activated and transistor MT is turned on, by operations of transistor MT and capacitors CP1, CP2, Node2 and Node3 have a same voltage value of ½ VDD. An NMOS transistor used as transistor MT is used for illustration. Other circuits, such as a P-type transistor, to transfer the charges between Node2 and Node3 are within the contemplated scope of the present disclosure.

Charge pump 100 having two circuits 110 and 120 corresponding to two stages are for illustration. Charge pump 100 may have more than two stages and corresponding transistors MT coupling the stages. For example, circuit 100 has additional stage 3, stage 4, stage 5, etc. In such a situation, another first transistor MT is coupled between stage 2 and stage 3, another second transistor MT is coupled between stage 3 and stage 4, etc.

Waveforms

Figure 2:
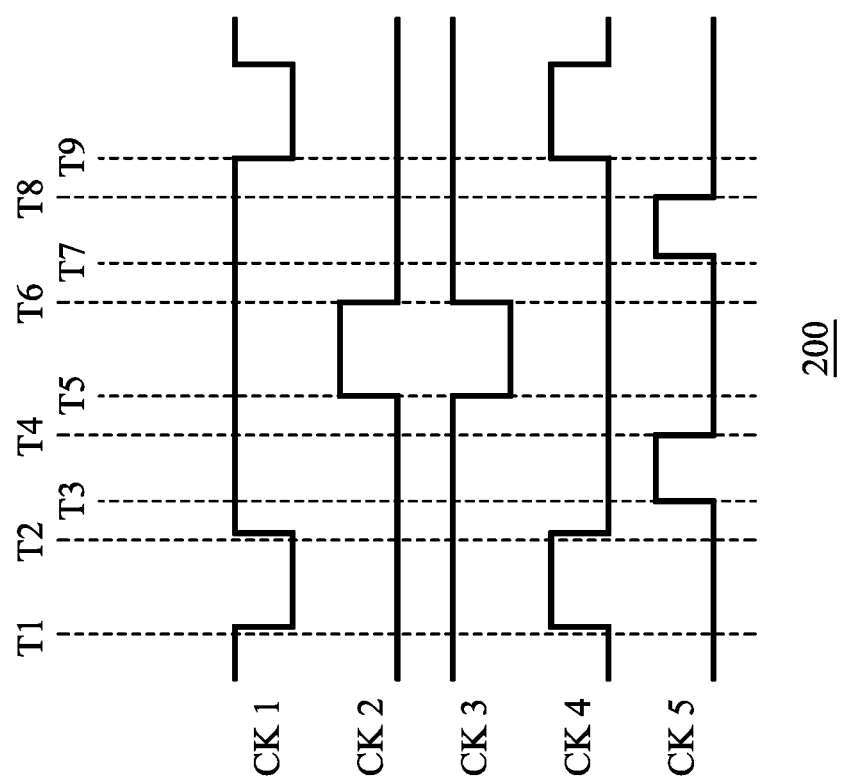
FIG. 2 is a graph of waveforms illustrating operations of the charge pump in FIG. 1, in accordance with some embodiments.

FIG. 2 is a graph of waveforms 200, in accordance with some embodiments. Waveforms 200 are used to illustrate operations of charge pump 100 in FIG. 1.

In some embodiments, voltage Vin has a value of VDD. As a result, Node0 also has a voltage value of VDD as explained above. Further, considering that the voltage dropped across diode MD2 is insignificant compared with voltage VDD, Node1 having voltage Vout is also considered to have voltage VDD. For illustration, Node2 and Node3 are each driven to a low logical value. Different methods to drive Node2 and/or Node3 to a low logical value are within the contemplated scope of the present disclosure. For example, corresponding transistors MN1 and MN2 are turned on to pull Node2 and Node3 to sources of transistors MN1 and MN2, respectively.

As illustratively shown in waveforms 200, in some embodiments, before time T1, signal CK1 is logically high, and transistor MP1 is off. Signal CK2 is logically low, and transistor MN1 is off. Signal CK3 is logically high, and transistor MP2 is off. Signal CK4 is logically low, and transistor MN2 is off. Signal CK5 is logically low, and transistor MT is off. Because transistors MP1 and MN1 are off, Node2 is logically low. Because transistors MP2 and MN2 are off, Node3 is logically low.

Between time T1 and time T2, because signal CK1 is logically low, transistor MP1 is turned on, and Node2 is pulled to voltage VDD at the source of transistor MP1. Further, by operations of capacitor C1, Node0 having been at VDD is pumped to 2 VDD. Node1 follows Node0 through diode MD2 to be at 2 VDD. Additionally, because signal CK4 is logically high, transistor MN2 is turned on, which further strengthens the low logical value at Node3 by pulling Node3 to voltage VSS at the source of transistor MN2.

Between times T2 and T3, because signal CK1 is logically high, transistor MP1 is off, and Node2 is floating at the voltage value VDD. Further, because signal CK4 is logically low, transistor MN2 is turned off, and Node3 is floating at the voltage value of VSS.

At time T3, signal CK5 is applied with a high logical value. Because signal CK5 at the gate of transistor MT is logically high, transistor MT is turned on, and causes Node3 to have a same voltage value as that of Node2. Further, by operation of parasitic capacitors CP1 and CP2, Node2 having been at VDD causes Node2 and Node3 to have a same voltage value of ½ VDD.

At time T4, signal CK5 is logically low, and transistor MT is turned off. Node2 and Node3 remain at ½ VDD.

At time T5, signal CK2 is applied with a high logical value. As a result, transistor MN1 is turned on, and Node2 is pulled to VSS at the source of transistor MN1. Further, signal CK3 transitions to a low logical value, and transistor MP2 is turned on. As a result, Node3 is pulled to voltage VDD at the source of transistor MP2. Because Node1 has been at 2 VDD, by operations of capacitor C2, Node1 is pumped to 3 VDD. Effectively, charge pump 100 pumps input voltage Vin from VDD to result in output voltage Vout at 3 VDD. Explained differently, charge pump 100 provides a voltage pump of 2 VDD.

At time T7, signal CK5 is applied with a high logical value to transfer the charge between Node2 to Node3. Because Node3 is at VDD and Node2 is at 0 V, both Node3 and Node2 transition to be at ½ VDD.

At time T8, signal CK5 transitions to a low logical value, and transistor MT is turned off, leaving Node3 and Node2 floating at ½ VDD.

Time T9 corresponds to time T1 representing a start of a new cycle.

In some embodiments, if charge pump 100 includes additional stages, each stage would provide a voltage pump of 2 VDD. For example, if charge pump 100 includes a stage 3 and a stage 4, stage 3 would provide another voltage pump from 3 VDD to 5 VDD, and stage 4 would provide another voltage pump from 5 VDD to 7 VDD, etc.

In some embodiments, charge pump 100 runs at 100 Mhz, which corresponds to a clock cycle from times T1 to T6 of about 1000 ps. In some embodiments, a time period between times T1 and T2 is about 400 ps. A time period between times T2 and time T3 is about 50 ns. A time period between times T3 and T4 is about 100 ps. A time period between times T4 and T5 is about 50 ps, and a time period between times T5 and T6 is about 400 ps. The above time period values are used for illustration. Other values are within the contemplated scope of the present disclosure.

Various embodiments of the present disclosure are advantageous over other approaches. For example, between times T5 and T6, in other approaches, Node3 would be charged from 0 V to VDD. In contrast, in various embodiments of the present disclosure as illustrated with reference to FIG. 2, Node3 is charged from ½ VDD to VDD, which takes less energy to charge parasitic capacitor CP2. In some embodiments, the transition energy is about 4 times smaller than that of other approaches. Further, between times T5 and T6, in some other approaches, transistor MN2 would be turned on and cause current from transistor MP2 to flow through transistor MN2 to ground. In contrast, in various embodiments of the present disclosure, transistor MN2 is turned off, and no current from transistor MP2 flows through transistor MN2 to ground. Effectively, in various embodiments of the present disclosure, no current is wasted through transistor MN2 to ground. As a result, a current from transistor MP2 which flows through Node3 to other circuits (not shown) coupled to Node3 increases.

Circuit for Use in Charge Pump

Figure 3:
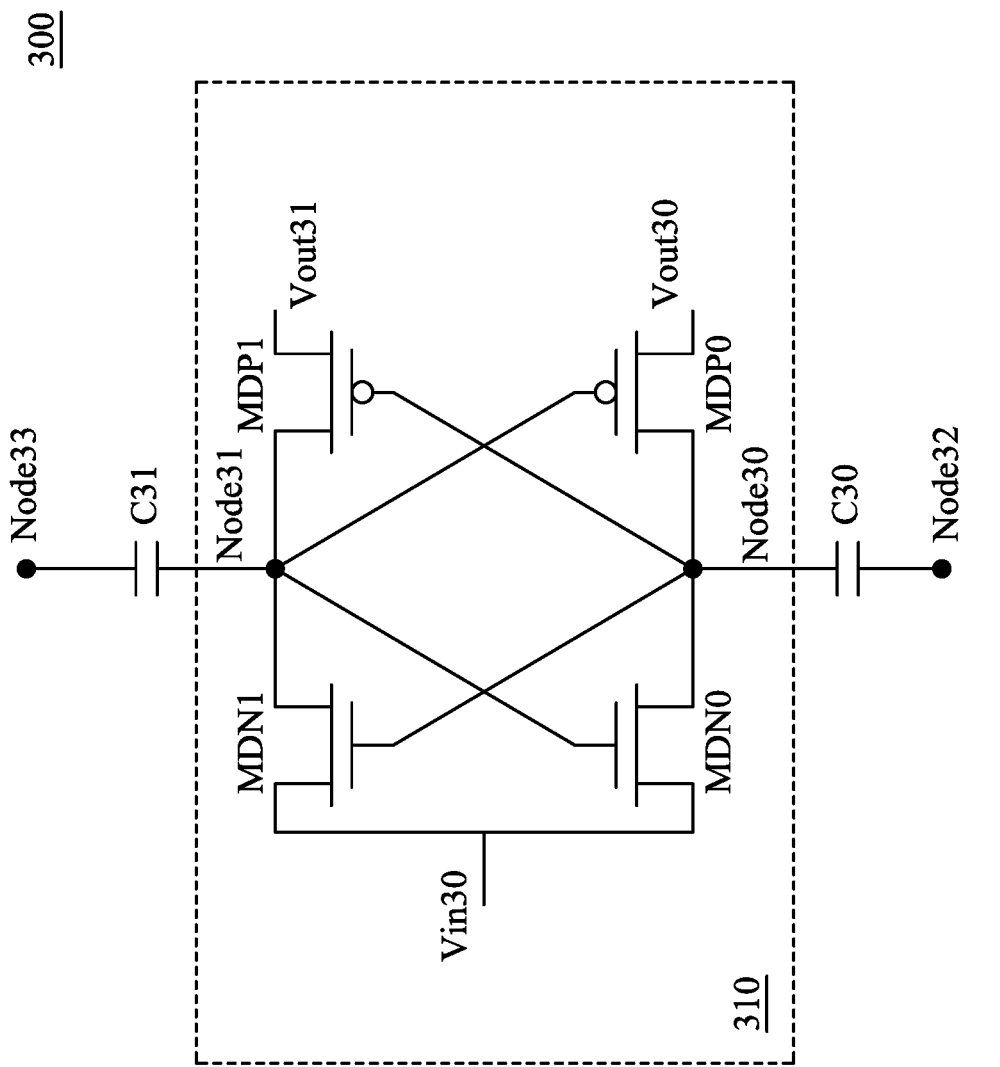
FIG. 3 is a diagram of a circuit used in the charge pump in FIG. 4, in accordance with some embodiments.

FIG. 3 is a diagram of a circuit 300, in accordance with some embodiments. Circuit 300 is used in the charge pump 400 in FIG. 4. Circuit 300 is called a voltage doubler because, for example, when input Vin30 of circuit 300 is at VDD, each output voltage Vout30 and Vout31 of circuit 300 is doubled to 2 VDD. In some embodiments, voltage Vout30 is doubled to 2 VDD at a different time from when voltage Vout31 is at 2 VDD.

In circuit 300, PMOS transistor MDP0 and NMOS transistor MDN0 have an inverter-like configuration. A drain of NMOS transistor MDN0 receives voltage Vin30 as an input. Node30 is formed by a source of transistor MDN0, a source of transistor MDP0, gates of transistors MDN1, MDP1, and one end of capacitor C30. A drain of transistor MDP0 is configured to provide an output voltage Vout30.

Similarly, PMOS transistor MDP1 and NMOS transistor MDN1 have an inverter-like configuration. A drain of NMOS transistor MDN1 is coupled with the drain of the transistor MDN0, and also receives voltage Vin30. Node31 is formed by a source of transistor MDN1, a source of transistor MDP1, gates of transistor MDN0, MDP0, and one end of capacitor C31. A drain of transistor MDP1 is configured to provide an output voltage Vout31.

In some embodiments when voltage Vin30 is at VDD and both Node30 and Nod31 are at 0 V, leakage current of transistors MDN0 and MDN1 cause corresponding Node30 and Node31 to be at VDD of input voltage Vin30.

In some embodiments, before Node30 and Node31 are pumped with an increased voltage such as voltage VDD, Node32 and Node33 are each applied with a low logical value. For illustration, Node33 then remains at the low logical value, and Node32 is applied with a high logical value of VDD. As a result, by operations of capacitor C30, Node30 is pumped to 2 VDD. Because Node31 at the gate of transistor MDP0 is VDD and Node30 at the source of transistor MDP0 is 2 VDD, PMOS transistor MDP0 is turned on. Consequently, voltage Vout30 is also 2 VDD by following Node30 through transistor MDP0. In contrast, when Node32 remains at the low logical value, and Node33 is applied with a high voltage value of VDD, Node31 is pumped to 2 VDD by operations of capacitor C31. Consequently, voltage Vout31 is also 2 VDD by following Node31 through transistor MDP1, which is then turned on.

Based on the above illustrations, the time voltage Vout30 or voltage Vout31 is at 2 VDD depends on when Node32 or Node33 is applied with voltage value VDD. In some embodiments other than shown in FIG. 3, the drains of transistors MDP0 and MDP1 are coupled together to provide a voltage Vout3 (not labeled), for example, in place of voltages Vout30 and Vout31. Effectively, when either Node31 or Node32 is applied with the high logical value of VDD, voltage Vout3 is at 2 VDD.

Voltage doubler 310 is used for illustration. Other circuits to transfer voltage Vin30 to Node30 and/or Node31, then to corresponding voltage Vout30 and Vout31 are within the contemplated scope of the present disclosure.

Charge Pump

Figure 4:
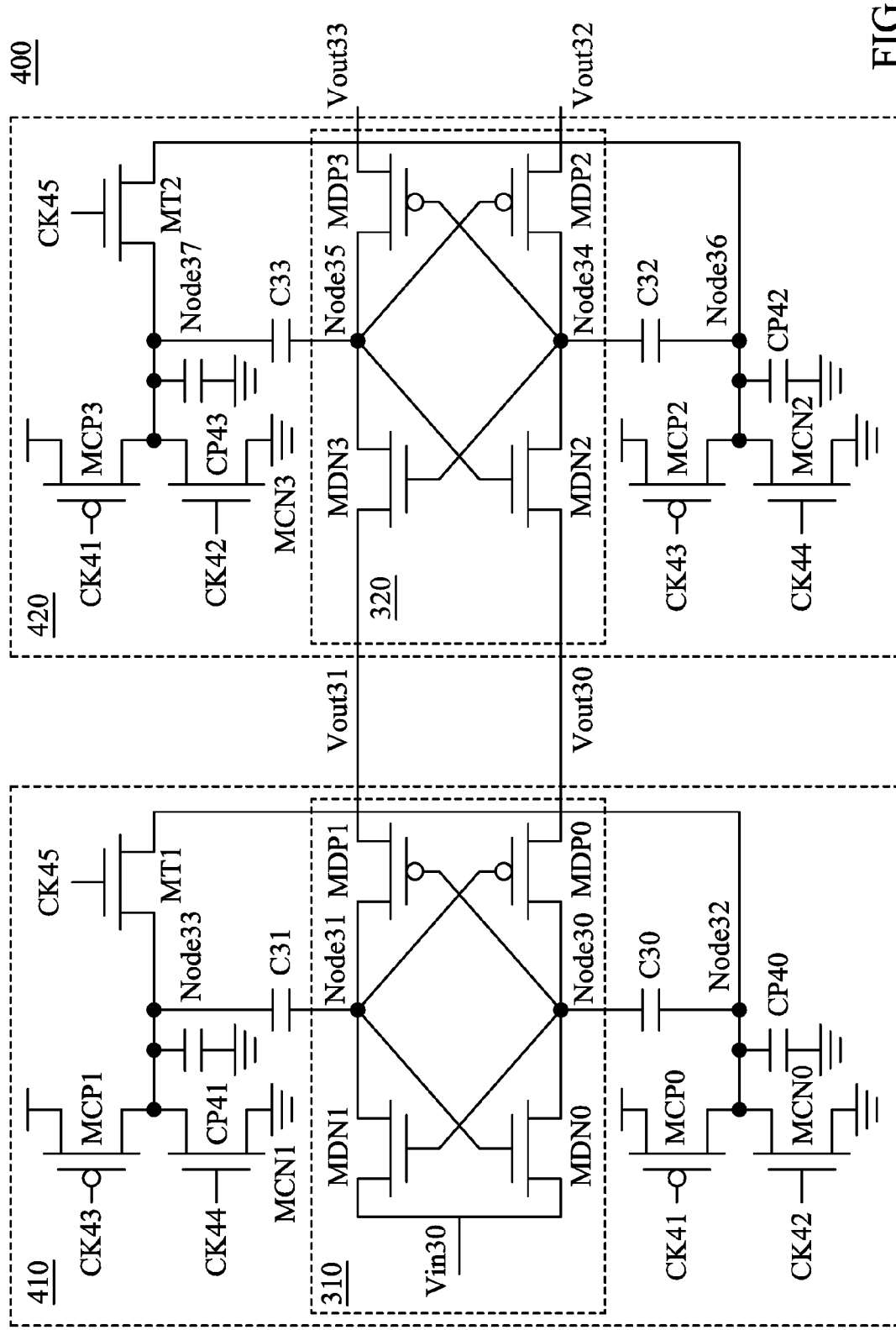
FIG. 4 is a diagram of another charge pump, in accordance with some embodiments.

FIG. 4 is a diagram of a circuit 400, in accordance with some embodiments. Circuit 400 is a charge pump that uses circuit 300 in FIG. 3.

Circuit 410 represents a first voltage pump stage for charge pump 400. In circuit 410, PMOS transistor MCP0 and NMOS transistor MCN0 are coupled in series, and have an inverter-like configuration. Further, a source of transistor MCP0 receives supply voltage VDD. A gate of transistor MCP0 receives clock signal CK41. A drain of transistor MCP0 is coupled with a drain of transistor MCN0, and one end of capacitor C30 at Node32. In some embodiments, capacitor CP40 represents parasitic capacitance of Node32. In other embodiments, capacitor CP40 is an actual capacitor and is considered to have capacitance that includes parasitic capacitance of Node32.

PMOS transistor MCP1 and NMOS transistor MCN1 have a similar configuration as that of PMOS transistor MCP0 and NMOS transistor MCN0. For example, transistors MCP1 and MCN1 correspond to transistors MCP0 and MCN0, respectively. Clock signals CK43, CK44 correspond to clock signal CK41, CK42, respectively. Capacitor CP41 corresponds to capacitor CP40.

Circuit 310 and capacitors C30, C31 are described above with reference to FIG. 3.

Transistor MT1 is coupled between Node32 and Node33, and functions to transfer charges between Node32 and Node33. Similar to transistor MT in FIG. 1, other circuits used to transfer charges between Node32 and Node33 are within the contemplated scope of the present disclosure.

Circuit 420 represents a second voltage pump stage for charge pump 400. Circuit 420 includes circuitry corresponding to circuitry in circuit 410. For example, circuit 320 corresponds to circuit 310. Transistors MDN3, MDP3, MDN2, MDP2, and MT2 correspond to transistors MDN1, MDP1, MDN0, MDP0, and MT1, respectively. However, the drains of transistors MDN3, MDN2 are not coupled together. Rather, the drains of transistors MDN3, MDN2 are configured to receive voltage Vout31, Vout30, respectively. When each of voltage Vout30 or Vout31 is at 2 VDD, circuit 420 pumps the 2 VDD to result in 3 VDD at the corresponding Vout32, Vout33, respectively, as will be explained below.

In embodiments that the sources of transistors MDP1 and MDP0 are coupled together, the drains of transistors MDN3 and MDN2 are also coupled together. In such a situation, circuit 320 is the same as circuit 310.

Waveforms

Figure 5:
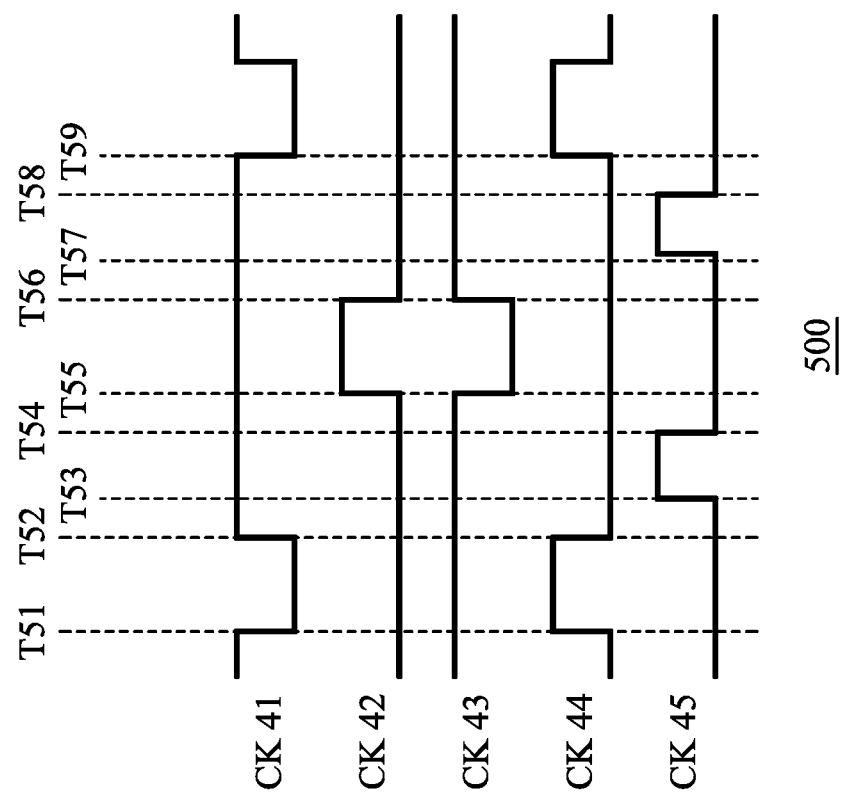
FIG. 5 is a graph of waveforms illustrating operations of the charge pump in FIG. 4, in accordance with some embodiments.

FIG. 5 is a graph of waveforms 500, in accordance with some embodiments. Waveforms 500 are used to illustrate operations of circuit 400 in FIG. 4.

For illustration, voltage Vin30 is logically high at voltage value VDD. As a result, Node30 and Node31 are each logically high at VDD of input voltage Vin, as explained above with reference to FIG. 3.

Before time T51, signal CK41 is logically high, and transistor MCP0 is turned off. Signal CK42 is logically low, and transistor MCN0 is turned off. Signal CK43 is logically high, and transistor MCP2 is turned off. Signal CK44 is logically low, and transistor MCN1 is turned off. Signal CK45 is logically low, and transistor MT1 is turned off. Further, Node32 is logically low. Node33 is also logically low.

At time T51, signal CK41 transitions to a low logical value, and transistor MCP0 is turned on. As a result, Node32 is pulled to voltage VDD at the source of transistor MCP0. Further, signal CK44 transitions to a high logical value, and transistor MCN1 is turned on. As a result, Node33 is pulled to a low logical value of voltage VSS (not labeled) or ground at the source of transistor MCN1.

At time T52, signal CK41 transitions to a high logical value, and transistor MCP0 is off. Signal CK44 is logically low, and transistor MCN1 is off.

At time T53, signal CK45 is applied with a high logical value, transistor MT1 is turned on, and causes Node32 and Node33 to have a same voltage value. Further, because Node32 is at VDD and Node33 is at 0 V, by operations of capacitors CP40 and CP41, Node32 and Node33 are at a same value of ½ VDD.

At time T54, signal CK45 transitions to a low logical value, and transistor MT1 is turned off, leaving Node32 and Node33 floating at ½ VDD.

At time T55, signal CK42 is applied with a high logical value, and transistor MCN0 is turned on. As a result, Node32 is pulled to a low logical value of VSS at the source of transistor MCN0. Further, signal CK43 transitions to a low logical value, and transistor MCP1 is turned on. As a result, Node33 is pulled from ½ VDD to VDD at the source of transistor MCP1. As explained above with reference to FIG. 3, when Node32 is at 0V and Node33 is pumped to VDD, and Node31 is at VDD, Node31 is pumped to 2 VDD. Voltage Vout31 also follows the voltage at Node31 to be at 2 VDD.

At time T56, signal CK42 transitions to a low logical value, and transistor MCN0 is turned off. Node32 is thus floating at VSS. Further, signal CK43 transitions to a high logical value, and transistor MCP1 is turned off. Node33 is thus floating at VDD.

At time T57, signal CK45 transitions to a high logical value, and transistor MT1 is turned on. As a result, Node32 and Node33 have the same voltage value of ½ VDD.

At time T58, signal CK45 transitions to a low logical value, and transistor MT1 is turned off. Node32 and Node33 are floating at ½ VDD.

Time T59 corresponds to time T51 indicating start of a new cycle.

With reference to circuit 420 representing stage 2, transistors MCP3 and MCN3 receive signals CK41 and CK42, respectively, corresponding to transistors MCP0 and MCN0 receiving signals CK41 and CK42, respectively. As a result, Node37 behaves in a manner similar to Node32, and voltage Vout33 behaves in a manner similar to voltage Vout30. Similarly, transistors MCP2 and MCN2 receive signals CK43 and CK44, respectively, corresponding to transistors MCP1 and MCN1 receiving signals CK43 and CK44, respectively. As a result, Node36 behaves in a manner similar to Node33, and voltage Vout32 behaves in a manner similar to voltage Vout31. Circuit 420 has operations similar to those of circuit 410, and pumps voltage Vout31 and voltage Vout30 by voltage VDD to voltage Vout33 and Vout32 in a manner similar to circuit 410 pumps voltage Vin30 to voltage Vout31 and Vout30, respectively.

Charge Pump

Figure 6:
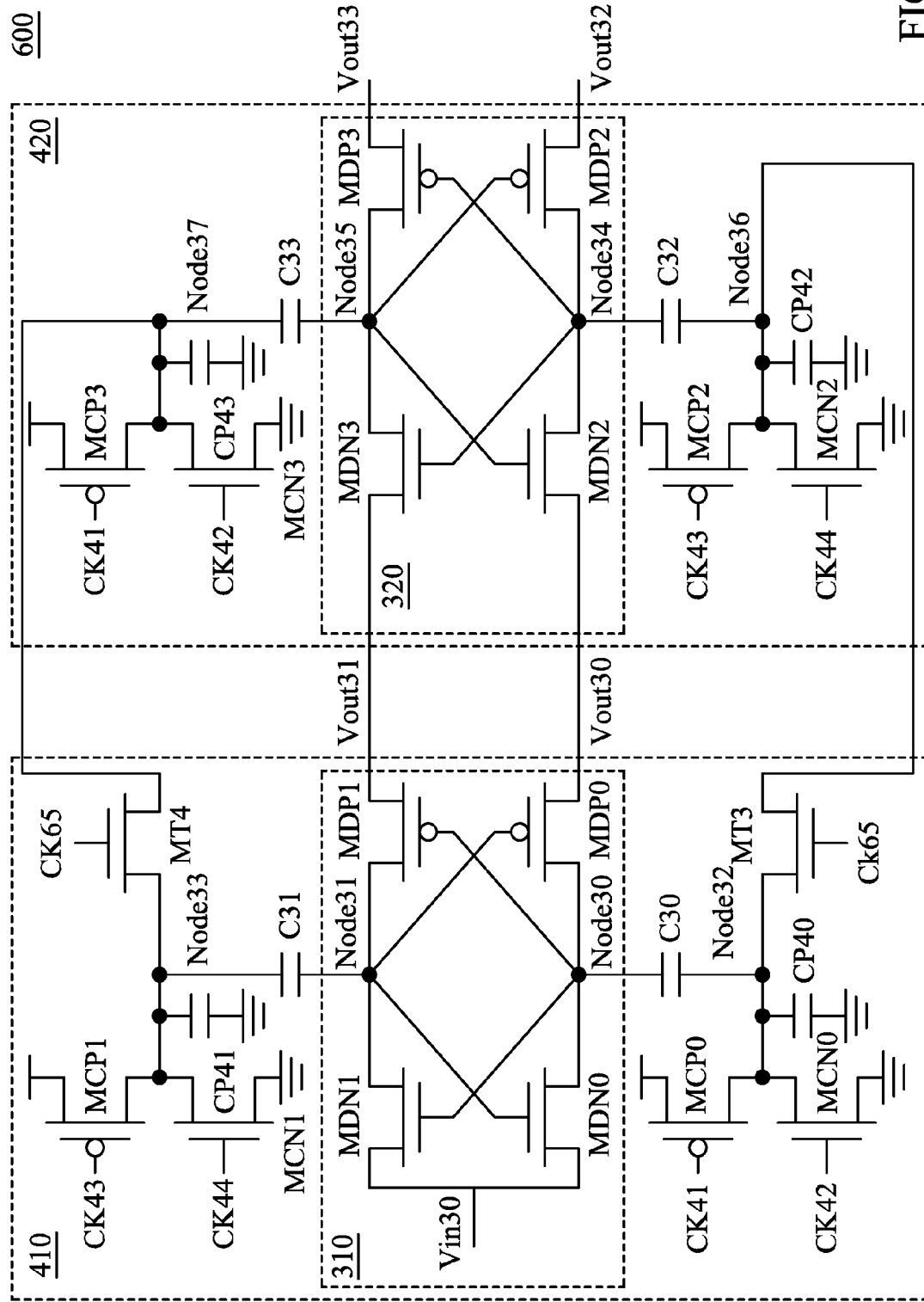
FIG. 6 is a diagram of another charge pump, in accordance with some embodiments.

FIG. 6 is a diagram of a circuit 600, in accordance with some embodiments. Circuit 600 is also a charge pump. Compared with charge pump 400, charge pump 600 does not include transistors MT1 and MT2, but includes transistor MT3 and MT4. However, transistor MT3 is coupled between Node32 and Node36, while transistor MT4 is coupled between Node33 and Node37. Both transistors MT3 and MT4 are turned on or off by signal CK65. Functionally, circuit 600 is the same as circuit 400. For example, circuit 600 includes the same input voltage Vin30 and the same output voltages Vout32 and Vout33 as in circuit 400. In circuit 600, Node37 behaves in a manner similar to Node32 because transistors MCP3 and MCN3 correspond to transistors MCP0 and MCN0, and receive the same signals CK41 and CK42 received by transistors MCP0 and MCN0. Similarly, Node36 behaves in a manner similar to Node33 because transistors MCP2 and MCN2 correspond to transistors MCP1 and MCN1, and receive the same signals CK43 and CK44 received by transistors MCP1 and MCN1. In circuit 600, when transistor MT3 is turned on to transfer the charge between Node32 and Node36, the voltage of Node33 is similar to that of Node36. Explained in a different way, Node33 and Node32 share the same charge as if transistor MT1 in FIG. 4 transfers the charge between Node33 and Node32. Further, when transistor MT4 is turned on to transfer the charge between Node33 and Node37, the voltage of Node32 is similar to that of Node37. Explained in a different way, Node33 and Node32 share the same charge as if transistor MT1 in FIG. 4 transfers the charge between Node33 and Node32.

Waveforms

Figure 7:
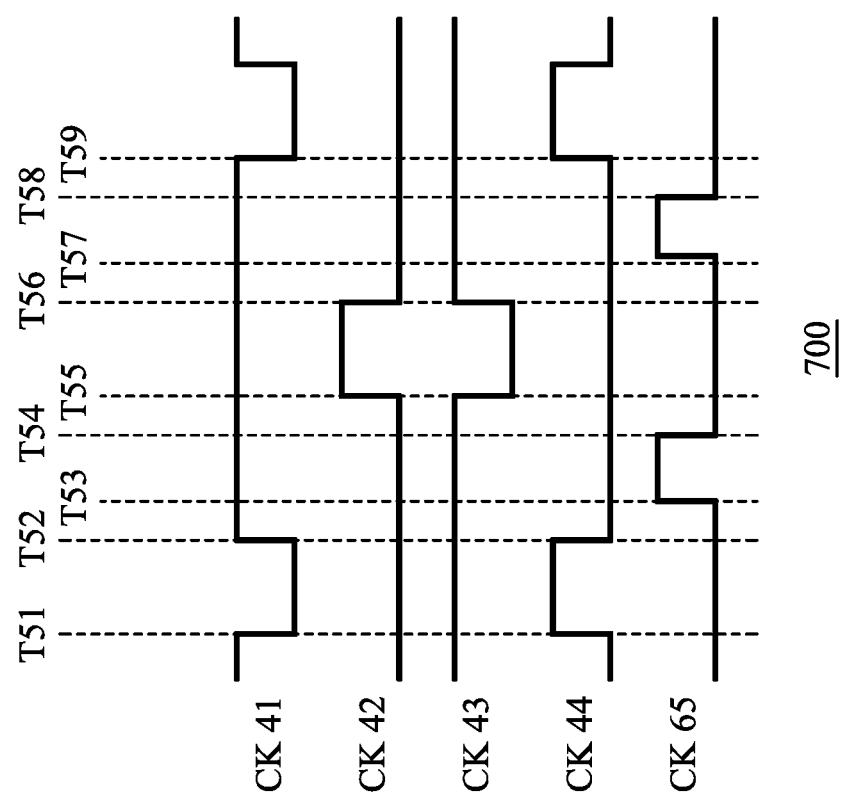
FIG. 7 is a graph of waveforms illustrating operations of the charge pump in FIG. 6.

FIG. 7 is a graph of waveforms 700, in accordance with some embodiments. Waveforms 700 are used to illustrate operations of circuit 600 in FIG. 6.

For illustration, voltage Vin30 is logically high at voltage value VDD. As a result, Node30 and Node31 are each logically high at VDD of input voltage Vin, as explained above with reference to FIG. 3.

Before time T51, signal CK41 is logically high, and transistor MCP0 is turned off. Signal CK42 is logically low, and transistor MCN0 is turned off. Signal CK43 is logically high, and transistor MCP2 is turned off. Signal CK44 is logically low, and transistor MCN2 is turned off. Signal CK65 is logically low, and transistors MT3 and MT4 are turned off. Further, Node32 is logically low. Node33 is also logically low.

At time T51, signal CK41 transitions to a low logical value, and transistor MCP0 is turned on. As a result, Node32 is pulled to voltage VDD at the source of transistor MCP0. Further, signal CK44 transitions to a high logical value, and transistor MCN1 is turned on. As a result, Node33 is pulled to a low logical value of voltage VSS (not labeled) or ground at the source of transistor MCN1.

At time T52, signal CK41 transitions to a high logical value, and transistor MCP0 is off. Signal CK44 is logically low, and transistor MCN1 is off.

At time T53, signal CK65 is applied with a high logical value, transistor MT3 is turned on, and causes Node32 and Node36 to have a same voltage value. Further, Node36 is also at 0 V because Node36 behaves in a same manner as Node33 as explained above. Because Node32 is at VDD and Node36 is at 0 V, by operation of capacitors CP40 and CP42, Node32 and Node36 are at a same value of ½ VDD. Also, transistor MT4 is turned on, and causes Node33 and Node37 to have a same voltage value.

At time T54, signal CK65 transitions to a low logical value, and transistor MT3 is turned off, leaving Node32 and Node36 floating at ½ VDD.

At time T55, signal CK42 is applied with a high logical value, and transistor MCN0 is turned on. As a result, Node32 is pulled to a low logical value of VSS at the source of transistor MCN0. Further, signal CK43 transitions to a low logical value, and transistor MCP2 is turned on. As a result, Node36 is pulled from ½ VDD to VDD at the source of transistor MCP2. As explained above, the behavior of Node33 is the same as that of Node36, Node36 is also pumped to VDD. As explained with reference to FIG. 3, when Node32 is at 0V and Node33 is pumped to VDD, and Node31 is at VDD, Node31 is pumped to 2 VDD.

Voltage Vout31 also follows the voltage at Node31 to be at 2 VDD.

At time T56, signal CK42 transitions to a low logical value, and transistor MCN0 is turned off. Node32 is thus floating at VSS. Further, signal CK43 transitions to a high logical value, and transistor MCP2 is turned off. Node33 is thus floating at VDD.

At time T57, signal CK65 transitions to a high logical value, and transistor MT3 is turned on. As a result, Node32 and Node36 have the same voltage value of ½ VDD. Also, MT4 is turned on, and Node33 and Node37 have the same voltage value of ½ VDD.

At time T58, signal CK65 transitions to a low logical value, and transistors MT3 and MT4 are turned off. Node32 and Node36 are floating at ½ VDD, and Node33 and Node37 are floating at ½ VDD.

Time T59 corresponds to time T51 indicating start of a new cycle.

In some embodiments, a charge pump circuit comprises a first circuit, a second circuit, a charge transferring circuit, a first capacitive element, a second capacitive element, a first voltage transfer element, and a second voltage transfer element. The first circuit is configured to provide a first node with a first first-voltage level or a first second-voltage level. The second circuit is configured to provide a second node with a second first-voltage level or a second second-voltage level. The charge transferring circuit is coupled between the first node and the second node, and is configured to transfer charge between the first node and the second node. The first node is coupled with a first end of the first capacitive element. The second node is coupled with a first end of the second capacitive device. A first end of the first voltage transfer circuit is configured to receive an input voltage. A second end of the first voltage transfer circuit is coupled with a second end of the first capacitive device and a first end of the second voltage transfer circuit. A second end of the second voltage transfer circuit is coupled with a second end of the second capacitive element, and is configured to provide an output voltage.

In some embodiments, a charge pump circuit comprises a first circuit, a second circuit, a voltage transferring circuit, a first capacitive element, and a second capacitive element. The first circuit is configured to provide a first node with a first first-voltage level or a first second-voltage level. The second circuit is configured to provide a second node with a second first-voltage level or a second second-voltage level. The first node is coupled with a first end of the first capacitive element. A first node of the voltage transferring circuit is coupled with a second end of the first capacitive element. The second node is coupled with a first end of the second capacitive element. A second node of the voltage transferring circuit is coupled with a second end of the second capacitive element. The voltage transferring circuit is configured to transfer an input voltage to the first node of the voltage transferring circuit and to the second node of the voltage transferring circuit, to transfer a voltage of the first node of the voltage transferring circuit to a first output voltage, and to transfer a voltage of the second node of the voltage transferring circuit to a second output voltage.

In some embodiments of a method, a first node and a second node are caused to have a first high logical value. A third node and a fourth node are caused to have a low logical value. The third node is caused to have the first high logical value, resulting in the first node to transition from the first high logical value to a second high logical value through a first capacitive element. The second node is caused to have the second high logical value based on the second high logical value of the first node. The third node and the fourth node are caused to have a same voltage value about half of a voltage value of the first high logical value. The fourth node is caused to have the first high logical value, resulting in the second node transitioning from the second high logical value to a third high logical value through a second capacitive element. A voltage value of second high logical value is higher than a voltage value of the first high voltage value and is lower than a voltage value of the third high logical value.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source. As such, the term source and drain are used interchangeably. Various signals are generated by corresponding circuits, but, for simplicity, the circuits are not shown.

Various figures show capacitive circuits using discrete capacitors for illustration. Equivalent circuitry may be used. For example, a capacitive device, circuitry or network (e.g., a combination of capacitors, capacitive elements, devices, circuitry, etc.) can be used in place of the discrete capacitor. The above illustrations include exemplary steps, but the steps are not necessarily performed in the order shown. Steps may be added, replaced, changed order, and/or eliminated as appropriate, in accordance with the spirit and scope of disclosed embodiments.

What is claimed is:
1. A charge pump circuit comprising:
    a first circuit configured to provide a first node with a first first-voltage level or a first second-voltage level;
    a second circuit configured to provide a second node with a second first-voltage level or a second second-voltage level;
    a charge transferring circuit coupled between the first node and the second node, and configured to transfer charge between the first node and the second node;
    a first capacitive element;
    a second capacitive element; and
    a first voltage transfer circuit;
    wherein
        the first node is coupled with a first end of the first capacitive element;
        the second node is coupled with a first end of the second capacitive element;
        a first end of the first voltage transfer circuit is configured to receive an input voltage; and
        a first node of the first voltage transfer circuit is coupled with a second end of the first capacitive element.
2. The charge pump circuit of claim 1, further comprising at least one of
    a third capacitive element coupled with the first node and the first end of the first capacitive element; or
    a fourth capacitive element coupled with the second node and the first end of the second capacitive element.

3. The charge pump circuit of claim 1, wherein
the charge transferring circuit includes a transistor;
a first terminal of the transistor is coupled with the first node;
a second terminal of the transistor is coupled with the second node; and
a third terminal of the transistor is configured to receive a control signal.

4. The charge pump circuit of claim 1, wherein
at least one of the first circuit or the second circuit includes an inverter-like configuration.

5. The charge pump circuit of claim 1, wherein
the first circuit comprises
  a first P-type transistor having a first P-source, a first P-drain, and a first P-gate; and
  a first N-type transistor having a first N-source, a first N-drain, and a first N-gate;
the second circuit comprises
  a second P-type transistor having a second P-source, a second P-drain, and a second P-gate;
  a second N-type transistor having a second N-source, a second N-drain, and a second N-gate;
  the first P-source is configured to receive a supply voltage;
  the first P-gate is configured to receive a first signal;
  the first P-drain is coupled with the first N-drain and the first node;
  the first N-gate is configured to receive a second signal;
  the first N-source is configured to receive a supply reference voltage;
  the second P-source is configured to receive the supply voltage;
  the second P-gate is configured to receive a third signal;
  the second P-drain is coupled with the second N-drain and the second node;
  the second N-gate is configured to receive a fourth signal; and
  the second N-source is configured to receive the supply reference voltage.

6. A charge pump circuit comprising:
a first circuit configured to provide a first node with a first first-voltage level or a first second-voltage level;
a second circuit configured to provide a second node with a second first-voltage level or a second second-voltage level;
a voltage transferring circuit;
a charge transferring circuit coupled between the first node and the second node;
a first capacitive element; and
a second capacitive element,
wherein
  the first node is coupled with a first end of the first capacitive element;
  a first node of the voltage transferring circuit is coupled with a second end of the first capacitive element;
  the second node is coupled with a first end of the second capacitive element;
  a second node of the voltage transferring circuit is coupled with a second end of the second capacitive element; and
  the voltage transferring circuit is configured
    to transfer an input voltage to the first node of the voltage transferring circuit and to the second node of the voltage transferring circuit;
    to transfer a voltage of the first node of the voltage transferring circuit to a first output voltage; and
    to transfer a voltage of the second node of the voltage transferring circuit to a second output voltage.

7. The charge pump circuit of claim 6, further comprising at least one of
a third capacitive element coupled to the first node; or
a fourth capacitive element coupled to the second node.

8. The charge pump circuit of claim 6, wherein
the charge transferring circuit includes a transistor;
a first terminal of the transistor is coupled with the first node;
a second terminal of the transistor is coupled with the second node; and
a third terminal of the transistor is configured to receive a control signal.

9. The charge pump circuit of claim 6, further comprising
a second charge transferring circuit coupled between a third node and a fourth node.

10. The charge pump circuit of claim 9, wherein
the second charge transferring circuit includes a transistor;
a first terminal of the transistor is coupled with the third node;
a second terminal of the transistor is coupled with the fourth node; and
a third terminal of the transistor is configured to receive a control signal.

11. The charge pump circuit of claim 6, wherein
the voltage transferring circuit is configured to provide the first output voltage and the second output voltage on a same output node.

12. The charge pump circuit of claim 6, wherein
the voltage transferring circuit comprises a first inverter-like configuration and a second inverter-like configuration;
a first terminal of the first inverter-like configuration is coupled with a first terminal of the second inverter-like configuration, and is configured to receive an input signal;
the first node of the voltage transferring circuit is coupled with an N-gate of the second inverter-like configuration and a P-gate of the second inverter-like configuration; and
the second node of the voltage transferring circuit is coupled with an N-gate of the first inverter-like configuration and a P-gate of the first inverter-like configuration.

13. The charge pump circuit of claim 6, wherein
at least one of the first circuit or the second circuit comprises an inverter-like configuration;
a P-gate of the inverter-like configuration is configured to receive a first signal;
an N-gate of the inverter-like configuration is configured to receive a second signal; and
drains of the inverter-like configuration are coupled with the first node or the second node.

14. The charge pump circuit of claim 6, further comprising:
a third circuit configured to provide a third node with the first first-voltage level or the first second-voltage level;
a fourth circuit configured to provide a fourth node with the second first-voltage level or the second second-voltage level;
another charge transferring circuit coupled between the third node and the fourth node;
a third capacitive element; and
a fourth capacitive element, wherein
- the third node is coupled with a first end of the third capacitive element;
- a third node of the voltage transferring circuit is coupled with a second end of the third capacitive element;
- the fourth node is coupled with a first end of the fourth capacitive element; and
- a fourth node of the voltage transferring circuit is coupled with a second end of the fourth capacitive element.

15. A method comprising:
causing a first node and a second node to have a first high logical value;
causing a third node and a fourth node to have a low logical value;
causing the third node to have the first high logical value, resulting in the first node to transition from the first high logical value to a second high logical value through a first capacitive element;
causing the third node and the fourth node to have a same voltage value about half of a voltage value of the first high logical value; and
causing the fourth node to have the first high logical value, resulting in the second node transitioning from the first high logical value to the second high logical value through a second capacitive element, wherein
- a voltage value of the second high logical value is higher than a voltage value of the first high voltage value.

16. The method of claim 15, comprising
causing the third node to float at the first high logical value and the fourth node to float at the low logical value, after the causing the third node to have the first high logical value.

17. The method of claim 15, satisfying at least one of the following conditions:
- the third node is coupled with drains of a first inverter-like configuration; or
- the fourth node is coupled with drains of a second inverter-like configuration.

18. The method of claim 15, satisfying at least one of the following conditions:
- a first circuit is configured to provide the third node with the low logical value of the first high logical value; or
- a second circuit is configured to provide the fourth node with the low logical value of the first high logical value.

19. The method of claim 15, wherein
a charge transferring circuit is coupled between the third node and the fourth node.

20. The method of claim 15, wherein
a first terminal of a first voltage transfer circuit receives an input signal;
a second terminal of the first voltage transfer circuit is coupled with the first node and a first terminal of a second voltage transfer circuit; and
a second terminal of the second voltage transfer circuit is coupled with the second node.

* * * * *